(12) United States Patent
Lin et al.

(10) Patent No.: US 12,129,334 B2
(45) Date of Patent: Oct. 29, 2024

(54) MODIFIED POLYURETHANE CARRIER SUBSTRATE

(71) Applicant: KUROKI INDUSTRIAL CO., LTD., New Taipei (TW)

(72) Inventors: Chih-Lung Lin, New Taipei (TW); Yi-Jyun Lou, New Taipei (TW); Chen-Ta Chen, New Taipei (TW)

(73) Assignee: KUROKI INDUSTRIAL CO., LTD., New Taipei (TW)

( * ) Notice: Subject to any disclaimer, the term of this patent is extended or adjusted under 35 U.S.C. 154(b) by 6 days.

(21) Appl. No.: 17/870,910

(22) Filed: Jul. 22, 2022

(65) Prior Publication Data

US 2024/0026064 A1 Jan. 25, 2024

(51) Int. Cl.
  *C08G 18/76* (2006.01)
  *C08G 18/42* (2006.01)
  *C08G 18/73* (2006.01)
  *C08G 18/75* (2006.01)

(52) U.S. Cl.
  CPC ..... *C08G 18/7664* (2013.01); *C08G 18/4277* (2013.01); *C08G 18/73* (2013.01); *C08G 18/758* (2013.01); *C08G 18/7628* (2013.01)

(58) Field of Classification Search
  CPC ................ C08G 18/346; C08G 18/10
  See application file for complete search history.

(56) References Cited

U.S. PATENT DOCUMENTS

| | | | |
|---|---|---|---|
| 6,335,417 B1 * | 1/2002 | Orikabe | C08G 18/8077 528/65 |
| 2007/0197720 A1 | 8/2007 | Ott et al. | |
| 2009/0240019 A1 * | 9/2009 | Inoue | C08G 18/4277 528/59 |
| 2013/0216840 A1 * | 8/2013 | Radhakrishnan | C09J 175/04 428/423.1 |
| 2017/0335047 A1 | 11/2017 | Cohen et al. | |

FOREIGN PATENT DOCUMENTS

| | | | | |
|---|---|---|---|---|
| CN | 101501098 B | | 1/2012 | |
| CN | 107108839 A | | 8/2017 | |
| JP | 2008045099 A | * | 2/2008 | |
| TW | 202000728 A | | 1/2020 | |
| WO | WO-2009117665 A2 | * | 9/2009 | ............ C08G 18/12 |

* cited by examiner

*Primary Examiner* — Michael M Dollinger
(74) *Attorney, Agent, or Firm* — Li & Cai Intellectual Property (USA) Office

(57) ABSTRACT

A modified polyurethane carrier substrate is provided. The modified polyurethane carrier substrate is formed from a modified polyurethane. The modified polyurethane includes a soft segment and a hard segment. The soft segment is formed from a polyol. The hard segment is formed from diisocyanate and a chain extender. The chain extender is dianhydride. A common logarithm of a ratio of a storage modulus of the modified polyurethane carrier substrate at −30° C. to a storage modulus of the modified polyurethane carrier substrate at 150° C. ranges from 0.40 to 1.30.

9 Claims, No Drawings

MODIFIED POLYURETHANE CARRIER SUBSTRATE

FIELD OF THE DISCLOSURE

The present disclosure relates to a modified polyurethane carrier substrate, and more particularly to a modified polyurethane carrier substrate with good thermal resistance.

BACKGROUND OF THE DISCLOSURE

With the emergence of the concept of metaverse, wearable devices related to augmented reality (AR) and virtual reality (VR) are gradually receiving more attention.

During a research process, one of the more desirable directions of development for relevant businesses is enhancing wearable device functionality and practicability. In order to enhance the functionality and practicability of the wearable devices, market requirements for properties of flexible printed circuits (FPC) have also been increased. In addition to having excellent elastic strength and flexibility, the flexible printed circuits must also possess good thermal resistance so as to meet the manufacturing requirements.

Due to its soft texture, good abrasion resistance, good impact resistance, and elasticity, polyurethane is usually used as a material of the flexible printed circuits that is used in smart fabric and interactive textiles (SFIT), such as clothing capable of sensing heartbeat. However, polyurethane has poor thermal resistance and cannot endure a high processing temperature. Therefore, how to enhance the thermal resistance of polyurethane has become an important issue to be addressed in the relevant industry.

SUMMARY OF THE DISCLOSURE

In response to the above-referenced technical inadequacies, the present disclosure provides a modified polyurethane carrier substrate.

In one aspect, the present disclosure provides a modified polyurethane carrier substrate. The modified polyurethane carrier substrate is formed from a modified polyurethane. The modified polyurethane includes a soft segment and a hard segment. The soft segment is formed from the polyol. The hard segment is formed from diisocyanate and a chain extender. The chain extender is dianhydride. A common logarithm of a ratio of a storage modulus of the modified polyurethane carrier substrate at −30° C. to a storage modulus of the modified polyurethane carrier substrate at 150° C.

$$\left(\log_{10}\left(\frac{E'(-30°\ C.)}{E'(150°\ C.)}\right)\right)$$

ranges from 0.40 to 1.30.

In certain embodiments, the chain extender is selected from the group consisting of: pyromellitic dianhydride (PMDA), 1,2,4,5-cyclohexanetetracarboxylic dianhydride (HPMDA), 4,4'-biphthalic anhydride (BPDA), 3,3',4,4'-benzophenonetetracarboxylic dianhydride (BTDA), 4,4'-(hexafluoroisopropylidene)diphthalic anhydride (6FDA), 4,4'-oxydiphthalic anhydride (ODPA), 3,4,9,10-perylenetetracarboxylic dianhydride (PTCDA), 4,4'-(4,4'-isopropylidenediphenoxy)bis(phthalic anhydride) (BPADA), and any combination thereof.

In certain embodiments, based on the total weight of the modified polyurethane being 100 wt %, an amount of the chain extender ranges from 10 wt % to 35 wt %.

In certain embodiments, based on the total weight of the modified polyurethane being 100 wt %, an amount of the hard segment ranges from 20 wt % to 70 wt %. Preferably, the amount of the hard segment ranges from 30 wt % to 50 wt %.

In certain embodiments, the hard segment includes a crankshaft structure that changes a direction of a molecular chain of the modified polyurethane, and the crankshaft structure is formed from the diisocyanate.

In certain embodiments, the diisocyanate that forms the crankshaft structure is selected from the group consisting of: 1,3-bis(isocyanatomethyl)cyclohexane ($H_6$XDI), isophorone diisocyanate (IPDI), 1,3-bis(2-isocyanato-2-propyl)benzene (TMXDI), m-xylyene diisocyanate (m-XDI), 2,4'-methylenebis(phenyl isocyanate) (2,4'-MDI), 2,2'-methylenebis(phenyl isocyanate) (2,2'-MDI), and any combination thereof.

In certain embodiments, based on the total weight of the modified polyurethane being 100 wt %, an amount of the crankshaft structure ranges from 10 wt % to 25 wt %.

In certain embodiments, the hard segment further includes a linear structure. The linear structure is formed from the diisocyanate. The diisocyanate that forms the linear structure is selected from the group consisting of: 4,4'-methylenebis(phenyl isocyanate) (4,4'-MDI), 4,4'-diisocyanato dicyclohexylmethane ($H_{12}$MDI), hexamethylene diisocyanate (HDI), and any combination thereof.

In certain embodiments, a mass ratio of the diisocyanate that forms the crankshaft structure to the diisocyanate that forms the linear structure ranges from 1:0.8 to 1:1.2.

In another aspect, the present disclosure provides a modified polyurethane carrier substrate. The modified polyurethane carrier substrate is formed from a modified polyurethane. The modified polyurethane includes a soft segment and a hard segment. The hard segment contains a crankshaft structure which changes the direction of the molecular chain of the modified polyurethane. A common logarithm of a ratio of a storage modulus of the modified polyurethane carrier substrate at −30° C. to a storage modulus of the modified polyurethane carrier substrate at 150° C.

$$\left(\log_{10}\left(\frac{E'(-30°\ C.)}{E'(150°\ C.)}\right)\right)$$

ranges from 0.40 to 1.30.

Therefore, in the modified polyurethane carrier substrate provided by the present disclosure, by virtue of the chain extender being a dianhydride, and a common logarithm of a ratio of a storage modulus of the modified polyurethane carrier substrate at −30° C. to a storage modulus of the modified polyurethane carrier substrate at 150° C. ranging from 0.40 to 1.30, the modified polyurethane carrier substrate can have good thermal resistance.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure does not contain drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a modified polyurethane carrier substrate. The modified polyurethane carrier substrate can be used to support an integrated circuit so as to be applied in smart fabric and interactive textiles. The modified polyurethane carrier substrate has good elastic strength and thermal resistance, which is appropriate for manufacturing flexible printed circuits. The thickness of the modified polyurethane carrier substrate of the present disclosure is not limited. Specifically, the modified polyurethane carrier substrate can be used as a membrane substrate or a plate substrate that is well-known in the related art.

The modified polyurethane carrier substrate of the present disclosure is formed from a modified polyurethane. The modified polyurethane contains a soft segment and a hard segment that are arranged in alternation. By adjusting the structure of the hard segment, the elastic strength and the thermal resistance of the modified polyurethane of the present disclosure can be enhanced. In addition, the modified polyurethane of the present disclosure can have good elastic strength either at a high temperature or a low temperature environment.

It should be noted that the elastic strength of polyurethane in the conventional technology is usually adjusted by changing a structure of the soft segment or changing a content ratio of the soft segment to the hard segment. Comparatively, the elastic strength of the modified polyurethane of the present disclosure is adjusted by changing the structure of the hard segment.

In the present disclosure, the elastic strength of the modified polyurethane is evaluated by measuring a storage modulus (E'). The storage modulus of the modified polyurethane is measured at a low temperature (−30° C.) and a high temperature (150° C.). Moreover, a common logarithm ($\log_{10}(x)$) of a ratio of the storage modulus of the modified polyurethane carrier substrate at −30° C. to the storage modulus of the modified polyurethane carrier substrate at 150° C.

$$\left(\log_{10}\left(\frac{E'(-30°\text{ C.})}{E'(150°\text{ C.})}\right)\right)$$

is calculated and can be used as a reference to evaluate a difference between the elastic strength of the modified polyurethane at low temperature and high temperature.

In the present disclosure, the common logarithm of the ratio of the storage modulus of the modified polyurethane carrier substrate at −30° C. to the storage modulus of the modified polyurethane carrier substrate at 150° C. ranges from 0.40 to 1.30. Preferably, the common logarithm of the ratio of the storage modulus of the modified polyurethane carrier substrate at −30° C. to the storage modulus of the modified polyurethane carrier substrate at 150° C. ranges from 0.70 to 1.20. Specific measuring manners and results are described later in the specification.

In the present disclosure, amounts of the soft segment and the hard segment can be adjusted according to requirements. In some embodiments, based on a total weight of the modified polyurethane being 100 wt %, an amount of the hard segment ranges from 20 wt % to 70 wt %. However, the present disclosure is not limited thereto.

In the present disclosure, the hard segment is formed from diisocyanate and a chain extender, and the soft segment is formed from the polyol.

[Chain Extender]

The chain extender is dianhydride. Using the chain extender can enhance thermal resistance and physical properties of the modified polyurethane. The modified polyurethane still can have a high thermal creep recovery even at a higher temperature. Accordingly, the modified polyurethane of the present disclosure can endure a higher processing temperature that meets the requirements for manufacturing the flexible printed circuits.

In one exemplary embodiment, a number average molecular weight of the chain extender ranges from 150 g/mol to 550 g/mol. However, the present disclosure is not limited thereto.

In one exemplary embodiment, the chain extender is dianhydride. Preferably, the chain extender can be pyromellitic dianhydride, 1,2,4,5-cyclohexanetetracarboxylic dianhydride, 4,4'-biphthalic anhydride, 3,3',4,4'-benzophenonetetracarboxylic dianhydride, 4,4'-(hexafluoroisopropylidene)diphthalic anhydride, 4,4'-oxydiphthalic anhydride, 3,4,9,10-perylenetetracarboxylic dianhydride, 4,4'-(4,4'-isopropylidenediphenoxy)bis(phthalic anhydride), or any combination thereof. Preferably, the chain extender is pyromellitic dianhydride. However, the present disclosure is not limited thereto.

In one exemplary embodiment, based on the total weight of the modified polyurethane being 100 wt %, the amount of the chain extender ranges from 10 wt % to 35 wt %. However, the present disclosure is not limited thereto.

[Diisocyanate]

The hard segment can be formed from one or more kinds of diisocyanate. A part of the diisocyanate can be polymerized to form the crankshaft structure, and another part of the diisocyanate can be polymerized to form a linear structure.

In some embodiments, all of the diisocyanate can be polymerized to form the crankshaft structure. In other embodiments, all of the diisocyanate can be polymerized to form the linear structure. In still other embodiments, a part of the diisocyanate can be polymerized to form the crankshaft structure, and another part of the diisocyanate can be polymerized to form the linear structure.

The crankshaft structure changes a direction of a molecular chain of the modified polyurethane such that the modified polyurethane of the present disclosure can have good elastic strength. In one exemplary embodiment, the hard segment of the modified polyurethane contains the crankshaft structure.

A main structure of the crankshaft structure can be formed from cyclohexane or one or more benzene rings. The crankshaft structure has two functional groups that are connected with cyclohexane or one or more benzene rings. In order to change the direction of the molecular chain of the modified polyurethane, the two functional groups are not arranged at opposite positions of the main structure.

Specifically, when the main structure of the crankshaft structure is a benzene ring, the two functional groups are not arranged at the para position of the benzene ring. When the main structure of the crankshaft structure contains two benzene rings, such as diphenylmethane, the two functional groups are not respectively arranged in position 4 of the two benzene rings. Similarly, when the main structure of the crankshaft structure is cyclohexane, the two functional groups are not arranged at opposite positions of cyclohexane.

In one exemplary embodiment, when the main structure of the crankshaft structure is a benzene ring, the two functional groups can be arranged at the meta position. When the main structure of the crankshaft structure contains two benzene rings, such as diphenylmethane, the two functional groups can be respectively arranged in position 2 of one benzene ring and in position 4 of the other benzene ring, or the two functional groups can be respectively arranged in position 2 of the two benzene rings.

Preferably, the crankshaft structure can be formed from an aliphatic isocyanate that has linkages with two isocyanate functional groups. For example, the main structure of the crankshaft structure can be cyclohexane, and the diisocyanate that forms the crankshaft structure can be 1,3-bis(isocyanatomethyl)cyclohexane or isophorone diisocyanate.

Preferably, the crankshaft structure can be formed from an aromatic isocyanate that has linkages with two isocyanate functional groups. For example, the main structure of the crankshaft structure can be benzene ring, and the diisocyanate that forms the crankshaft structure can be 1,3-bis(2-isocyanato-2-propyl)benzene or m-xylyene diisocyanate. When the main structure of the crankshaft structure contains two benzene rings, such as diphenylmethane, the diisocyanate that forms the crankshaft structure can be 2,4'-methylenebis(phenyl isocyanate) or 2,2'-methylenebis(phenyl isocyanate). In some embodiments, the crankshaft structure can be formed from monomers of m-xylyene diisocyanate and 2,4'-methylenebis(phenyl isocyanate).

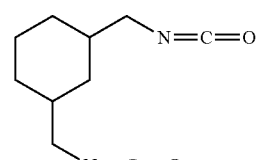

1,3-bis(isocyanatomethyl)cyclohexane

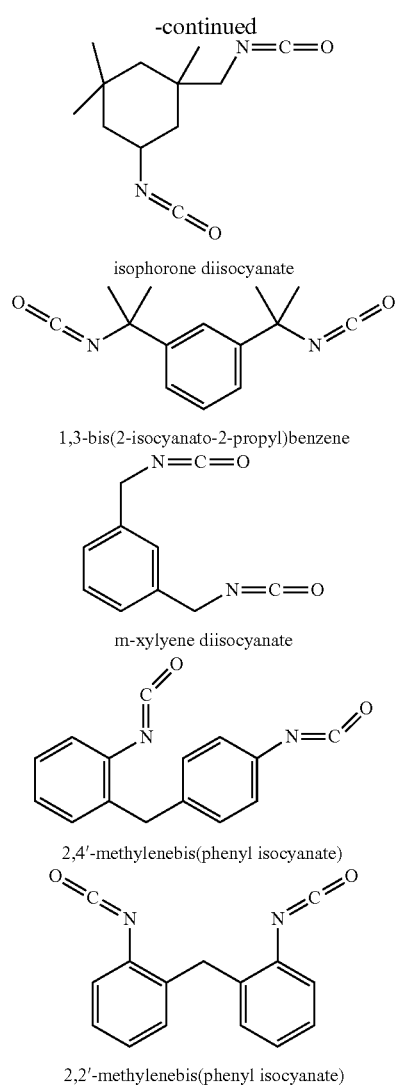

isophorone diisocyanate 1,3-bis(2-isocyanato-2-propyl)benzene m-xylyene diisocyanate 2,4'-methylenebis(phenyl isocyanate)

2,2'-methylenebis(phenyl isocyanate)

In one exemplary embodiment, based on the total weight of the modified polyurethane being 100 wt %, the amount of the crankshaft structure ranges from 10 wt % to 25 wt %. Preferably, based on the total weight of the modified polyurethane being 100 wt %, the amount of the crankshaft structure ranges from 12 wt % to 23 wt %. However, the present disclosure is not limited thereto.

A number average molecular weight of the diisocyanate that forms the crankshaft structure can range from 150 g/mol to 300 g/mol. On the other hand, a number average molecular weight of the diisocyanate that forms the linear structure can range from 100 g/mol to 400 g/mol. However, the present disclosure is not limited thereto.

For example, the diisocyanate that forms the linear structure can be 4,4'-methylenebis(phenyl isocyanate), 4,4'-diisocyanato-methylenedicyclohexane, hexamethylene diisocyanate, or any combination thereof. Preferably, the diisocyanate that form the linear structure can be 4,4'-methylenebis(phenyl isocyanate). However, the present disclosure is not limited thereto.

It should be noted that a main difference between the diisocyanate that forms the crankshaft structure and the diisocyanate that forms the linear structure is having different structures. In other words, the diisocyanate that forms the crankshaft structure and the diisocyanate that forms the linear structure can be isomers.

When the diisocyanate that forms the crankshaft structure and the diisocyanate that forms the linear structure are isomers, the modified polyurethane can have a lower glass transition temperature, and better elastic strength and flexibility. For example, the crankshaft structure is formed from 2,4'-methylenebis(phenyl isocyanate), and the linear structure is formed from 4,4'-methylenebis(phenyl isocyanate).

In one exemplary embodiment, a weight ratio of the diisocyanate that forms the crankshaft structure to the diisocyanate that forms the linear structure ranges from 1:0.8 to 1:1.2. However, the present disclosure is not limited thereto.

[Polyol]

An addition of the polyol can decrease the glass transition temperature of the modified polyurethane, thereby enhancing the elastic strength of the modified polyurethane. In some embodiments, the polyol can be polyester polyol (such as polydibutyl adipate or polycaprolactone), polycarbonate polyol, or polyether polyol (such as polytetramethylene ether glycol). However, the present disclosure is not limited thereto.

In some embodiments, a number average molecular weight of the polyol ranges from 400 g/mol to 4000 g/mol. However, the present disclosure is not limited thereto.

The modified polyurethane of the present disclosure can be presented as formula (I):

Formula (I)

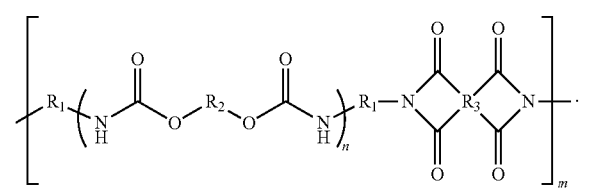

In formula (I), $R_1$ can be formed from diisocyanate selected from the group consisting of: 1,3-bis(isocyanatomethyl)cyclohexane, isophorone diisocyanate, 1,3-bis(2-isocyanato-2-propyl)benzene, m-xylyene diisocyanate, 2,4'-methylenebis(phenyl isocyanate), 2,2'-methylenebis(phenyl isocyanate), 4,4'-methylenebis(phenyl isocyanate), 4,4'-diisocyanato-methylenedicyclohexane, hexamethylene diisocyanate, and any combination thereof. $R_2$ can be formed from a polyol that has a number average molecular weight ranging from 50 g/mol to 4000 g/mol. $R_3$ can be cyclohexane with a tetravalent bond, benzene with a tetravalent bond, biphenyl with a tetravalent bond, benzophenone with a tetravalent bond, diphenyl propane with a tetravalent bond, diphenyl ether with a tetravalent bond, perylene with a tetravalent bond, or a structure with a tetravalent bond as shown as follows:

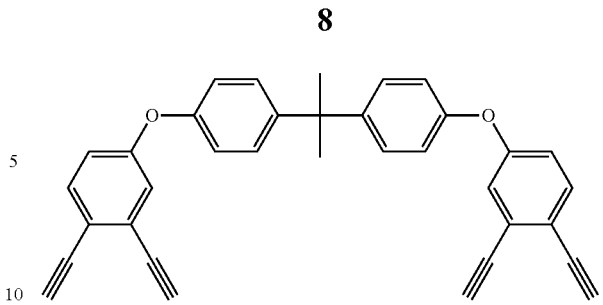

"n" and "m" each are independently integer ranging from 1 to 100.

Specifically, the modified polyurethane of the present disclosure can be presented as formula (II). In formula (II), "n" and "m" each are independently an integer ranging from 1 to 100.

Formula (II)

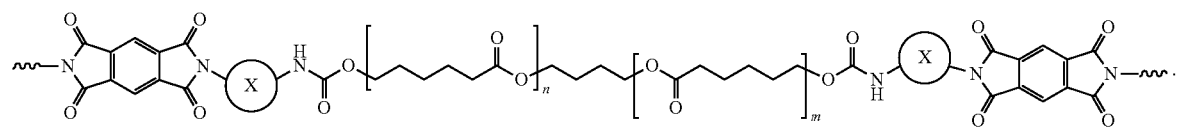

In formula (II), $\overset{\frown}{(X)}$ is selected from the group consisting of:

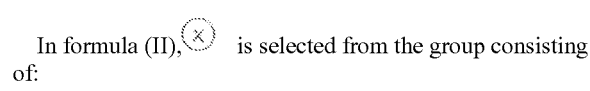

,

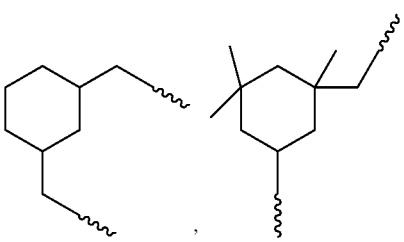

,

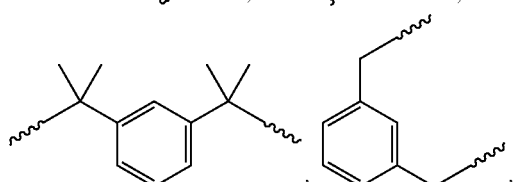

,

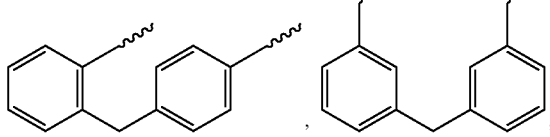

,

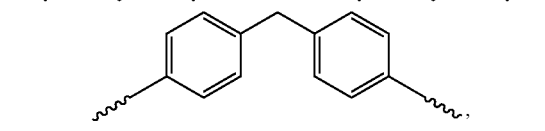

,

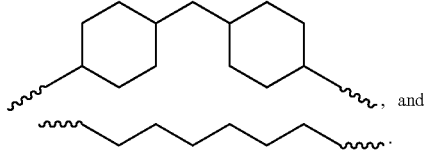

, and

.

Specific embodiments below illustrate a way of synthesizing the modified polyurethane and a formation of a modified polyurethane carrier substrate.

Example 1

16.8 g of 2,4'-diphenylmethanediisocyanate (2,4'-MDI) (crankshaft structure), 16.8 g of 4,4'-diphenylmethanediisocyanate (4,4'-MDI) (linear structure), and 100 g of polycaprolactone (PCL) are mixed at a temperature of 80° C. and stirred with a 300 rpm rotational speed, so as to form a polyurethane prepolymer. In Example 1, an amount of a theoretical bondable isocyanate group (NCO) is 5.20%.

17.2 g of pyromellitic anhydride (PMDA) (chain extender) is dissolved in N-methylpyrrolidone (NMP), and then added to the polyurethane prepolymer. After being stirred at a temperature of 60° C. with a 300 rpm rotational speed, a modified polyurethane solution is obtained. The modified polyurethane solution has a solid content of 45 wt %. After being centrifuged, dried (70° C. for 4 hours), and cured (180° C. for 2 hours), the modified polyurethane of the present disclosure can be obtained. Further, the modified polyurethane can be used to manufacture the modified polyurethane carrier substrate.

In Example 1, the amount of the chain extender (pyromellitic anhydride) is 11.4 wt %. The amount of the crankshaft structure in the modified polyurethane is 11.1 wt %.

Examples 2 to 4

Ways of synthesizing of Examples 2 to 4 are similar to the way of synthesizing of Example 1. The difference is that the amounts of diisocyanate and the chain extender are different. In Examples 1 to 4, the properties of the modified polyurethane are changed according to various amounts of the hard segment. The amount of the theoretical bondable isocyanate group (NCO) of the polyurethane prepolymer, the amount of the chain extender, and the amount of the crankshaft structure of the modified polyurethane are shown in Table 1.

Example 2 is obtained in the same manner as in Example 1, except that 23.1 g of 2,4'-diphenylmethanediisocyanate (2,4'-MDI), 23.1 g of 4,4'-diphenylmethanediisocyanate (4,4'-MDI), and 27.7 g of pyromellitic anhydride (PMDA) are used.

Example 3 is obtained in the same manner as in Example 1, except that 31.7 g of 2,4'-diphenylmethanediisocyanate (2,4'-MDI), 31.7 g of 4,4'-diphenylmethanediisocyanate (4,4'-MDI), and 42.1 g of pyromellitic anhydride (PMDA) are used.

Example 4 is obtained in the same manner as in Example 1, except that 98.9 g of 2,4'-diphenylmethanediisocyanate (2,4'-MDI), 98.9 g of 4,4'-diphenylmethanediisocyanate (4,4'-MDI), and 154.5 g of pyromellitic anhydride (PMDA) are used. It should be noted that the modified polyurethane of Example 4 is incapable of being prepared into the modified polyurethane carrier substrate due to excessive diisocyanate being added.

Examples 5 to 8

Ways of synthesizing of Examples 5 to 8 are similar to the way of synthesizing of Example 1. The difference is that the amounts of diisocyanate and the chain extender are different, and different diisocyanates are used. The influence of different structures of the hard segments and the properties of the modified polyurethane can be observed in Examples 5 to 8. The specific diisocyanate, the amount of the theoretical bondable isocyanate group (NCO) of the polyurethane prepolymer, the amount of the chain extender, and the amount of the crankshaft structure of the modified polyurethane are shown in Table 1.

Example 5 is obtained in the same manner as in Example 1, except that the diisocyanate is 4,4'-diphenylmethanediisocyanate (4,4'-MDI) (linear structure), and 46.5 g of 4,4'-diphenylmethanediisocyanate (4,4'-MDI) and 27.6 g of pyromellitic anhydride (PMDA) are used.

Example 6 is obtained in the same manner as in Example 1, except that the diisocyanate is 4,4'-diisocyanato dicyclohexylmethane ($H_{12}$MDI) (linear structure), and 47.3 g of 4,4'-diisocyanato dicyclohexylmethane ($H_{12}$MDI) and 27.3 g of pyromellitic anhydride (PMDA) are used.

Example 7 is obtained in the same manner as in Example 1, except that the diisocyanate is hexamethylene diisocyanate (HDI) (linear structure), and 35.0 g of hexamethylene diisocyanate (HDI) and 32.4 g of pyromellitic anhydride (PMDA) are used.

Example 8 is obtained in the same manner as in Example 1, except that the diisocyanate is m-xylylene diisocyanate (m-XDI) (crankshaft structure), and 37.8 g of m-xylylene diisocyanate (m-XDI) and 31.1 g of pyromellitic anhydride (PMDA) are used.

Comparative Example 1

29.2 g of 2,4'-diphenylmethanediisocyanate (2,4'-MDI) (crankshaft structure), 29.2 g of 4,4'-diphenylmethanediisocyanate (4,4'-MDI) (linear structure), and 100 g of polycaprolactone (PCL) are mixed at a temperature of 80° C. and stirred with a 300 rpm rotational speed, so as to form a polyurethane prepolymer. In Comparative Example 1, an amount of a theoretical bondable isocyanate group (NCO) is 9.58%.

15.6 g of 1, 4-butadiol (1, 4-BDO) is added in the polyurethane prepolymer at a temperature of 70° C., and then mixed to form a polyurethane colloid. The polyurethane colloid has a solid content of 100 wt %. After being centrifuged, dried (100° C. for 2 hours), and cured (100° C. for 15 hours), the polyurethane can be obtained and the polyurethane carrier substrate can be manufactured.

In Comparative Example 1, an amount of the chain extender (1, 4-butadiol) is 8.97 wt %. An amount of the crankshaft structure in the polyurethane is 16.8 wt %.
[Properties Test]

In order to compare the modified polyurethane of the present disclosure and conventional polyurethane, properties of the modified polyurethane carrier substrate of Examples 1 to 3 and 5 to 8 and the polyurethane carrier substrate of Comparative Example 1 are measured and listed in Table 2.

In Table 2, Young's modulus, tensile strength, and elongation at break of the modified polyurethane carrier substrates of Examples 1 to 8 and the polyurethane carrier substrate of Comparative Example 1 are tested according to the standard ASTM D638 (type V). Toughness is calculated by integrating an area under a stress-strain curve.

In Table 2, a glass transition temperature of the modified polyurethane carrier substrates of Examples 1 to 8 and the polyurethane carrier substrate of Comparative Example 1, a storage modulus at −30° C. (E'(−30° C.)), and a storage modulus at 150° C. (E'(150° C.)) are measured by a dynamic mechanical analyzer (brand: TECHMAX, model: TA7000). A common logarithm of a ratio of a storage modulus of the modified polyurethane carrier substrate at −30° C. to a storage modulus of the modified polyurethane carrier substrate at 150° C.

$$\left(\log_{10}\left(\frac{E'(-30°\ C.)}{E'(150°\ C.)}\right)\right)$$

is calculated to evaluate a difference between the elastic strength of the modified polyurethane at low temperature and high temperature.

In Table 2, a thermal expansion coefficient and a thermal creep recovery of the modified polyurethanes of Examples 1 to 8 and the polyurethane of Comparative Example 1 are measured by a thermomechanical analyzer (brand: TA, model: TMA450). The thermal creep recovery of the modified polyurethane is measured by applying a 0.05 N force on the modified polyurethane for 10 minutes at 150° C., releasing the force for 20 minutes, and then measuring a recovery ratio of the modified polyurethane.

In Table 2, a 5 wt % thermogravimetric loss and an ash content of the modified polyurethane of Examples 1 to 8 and the polyurethane of Comparative Example 1 are measured by a thermogravimetric analyzer (brand: HITACHI, model: STA7200).

In Table 2, a 25% permanent deformation ratio of the modified polyurethane carrier substrates of Examples 1 to 8 and the polyurethane carrier substrate of Comparative Example 1 are tested according to the standard ISO2285.

In Table 2, a moisture absorption rate of the modified polyurethane carrier substrates of Examples 1 to 8 and the polyurethane carrier substrate of Comparative Example 1 are tested according to the standard ASTM D570.

TABLE 1

|  |  | E1 | E2 | E3 | E4 | E5 | E6 | E7 | E8 | C1 |
|---|---|---|---|---|---|---|---|---|---|---|
| Diisocyanate (g) | 2,4'-MDI | 16.8 | 23.1 | 31.7 | 98.9 | — | — | — | — | 29.2 |
|  | 4,4'-MDI | 16.8 | 23.1 | 31.7 | 98.9 | 46.5 | — | — | — | 29.2 |
|  | $H_{12}$MDI | — | — | — | — | — | 47.3 | — | — | — |
|  | HDI | — | — | — | — | — | — | 35.0 | — | — |
|  | m-XDI | — | — | — | — | — | — | — | 37.8 | — |
| Polyol (g) | PCL | 100 | 100 | 100 | 100 | 100 | 100 | 100 | 100 | 100 |
| Chain extender (g) | PMDA | 17.2 | 27.7 | 42.1 | 154.5 | 27.6 | 27.3 | 32.4 | 31.1 | — |
|  | 1,4-BDO | — | — | — | — | — | — | — | — | 15.6 |
| Amount of bondable isocyanate group (NCO) (%) |  | 5.20 | 7.63 | 10.3 | 20.7 | 7.58 | 7.46 | 9.64 | 9.07 | 9.58 |
| Amount of hard segment in modified polyurethane (wt %) |  | 25 | 35 | 45 | 75 | 35 | 35 | 35 | 35 | 35 |
| Amount of chain extender in modified polyurethane (wt %) |  | 11.4 | 15.9 | 20.5 | 34.2 | 15.9 | 15.6 | 19.4 | 18.4 | 8.97 |
| Amount of crankshaft structure in modified polyurethane (wt %) |  | 11.1 | 13.3 | 15.4 | 21.9 | — | — | — | 22.4 | 16.8 |
| Amount of crankshaft structure in hard segment (wt %) |  | 25.6 | 25.5 | 25.5 | 25.4 | — | — | — | 51.0 | 25.5 |

TABLE 2

|  | E1 | E2 | E3 | E4 | E5 | E6 | E7 | E8 | C1 |
|---|---|---|---|---|---|---|---|---|---|
| Young's modulus (MPa) | 28.2 | 60.1 | 303.9 | — | 72.3 | 88.9 | 52.2 | 139.4 | 21.8 |
| Tensile strength (MPa) | 14.1 | 48.5 | 57.9 | — | 62.3 | 25.6 | 23.5 | 35.7 | 58.9 |
| Elongation at break (%) | 544.8 | 501.2 | 386.5 | — | 504.1 | 415.9 | 673.2 | 541.3 | 501.8 |
| Toughness (GJ/m$^3$) | 4.73 | 10.5 | 11.6 | — | 14.0 | 5.50 | 8.70 | 10.4 | 4.16 |
| Glass transition temperature (° C.) | −55.3 | −45.6 | −35.0 | — | −41.4 | −52.7 | −56.0 | −57.9 | −0.80 |
| Storage modulus (−30° C.) (Pa) | $9.30 \times 10^7$ | $3.38 \times 10^8$ | $1.26 \times 10^9$ | — | $2.01 \times 10^8$ | $2.48 \times 10^8$ | $3.40 \times 10^8$ | $3.32 \times 10^7$ | $2.13 \times 10^9$ |
| Storage modulus (150° C.) (Pa) | $1.17 \times 10^7$ | $2.23 \times 10^7$ | $1.18 \times 10^8$ | — | $2.47 \times 10^7$ | $2.78 \times 10^7$ | $1.98 \times 10^7$ | $5.79 \times 10^6$ | $4.90 \times 10^6$ |
| $\log_{10}\left(\frac{E'(-30°\ C.)}{E'(150°\ C.)}\right)$ | 0.90 | 1.18 | 1.03 | — | 0.91 | 0.95 | 1.23 | 0.76 | 2.64 |
| Thermal expansion coefficient (μm/° C.) | 3.85 | 2.93 | 2.07 | — | 1.92 | 2.34 | 2.44 | 2.21 | 3.59 |

TABLE 2-continued

|  | E1 | E2 | E3 | E4 | E5 | E6 | E7 | E8 | C1 |
|---|---|---|---|---|---|---|---|---|---|
| Thermal creep recovery (150° C.) (%) | Breakage | 60.7 | 62.5 | — | 65.4 | 66.0 | 73.7 | 66.7 | 4.20 |
| 5 wt % thermogravimetric loss (° C.) | 316.1 | 323.7 | 325.7 | — | 327.6 | 327.6 | 351.8 | 335.3 | 294.6 |
| Ash content (wt %) | 17.2 | 21.5 | 28.3 | — | 22.0 | 4.22 | 14.2 | 12.5 | 0.74 |
| 25% permanent deformation ratio (%) | 0.24 | 0.22 | 1.24 | — | 0.22 | 0.57 | 0.57 | 0.87 | 0.37 |
| Moisture absorption rate (%) | 0.48 | 0.38 | 0.75 | — | 0.55 | 1.11 | 0.75 | 0.74 | 1.12 |

According to the results in Table 2, compared to the conventional polyurethane carrier substrate, the modified polyurethane carrier substrate of the present disclosure has better physical properties (such as Young's modulus and toughness).

According to Examples 1 to 3, when the amount of the chain extender (pyromellitic anhydride) is increased, Young's modulus of the modified polyurethane carrier substrate is increased accordingly. In order to balance the elastic strength and the mechanical strength of the modified polyurethane carrier substrate, based on the total weight of the modified polyurethane being 100 wt %, the amount of the chain extender ranges from 10 wt % to 35 wt %. Preferably, the amount of the chain extender ranges from 10 wt % to 25 wt %. More preferably, the amount of the chain extender ranges from 12 wt % to 22 wt %.

In the present disclosure, Young's modulus of the modified polyurethane carrier substrate ranges from 20 MPa to 400 MPa. Preferably, Young's modulus of the modified polyurethane carrier substrate ranges from 25 MPa to 350 MPa. The tensile strength of the modified polyurethane carrier substrate ranges from 10 MPa to 65 MPa. Preferably, the tensile strength of the modified polyurethane carrier substrate ranges from 14 MPa to 63 MPa. The toughness of the modified polyurethane carrier substrate ranges from 4.5 $GJ/m^3$ to 18 $GJ/m^3$. Preferably, the toughness of the modified polyurethane carrier substrate ranges from 5 $GJ/m^3$ to 15 $GJ/m^3$. The elongation at break of the modified polyurethane carrier substrate ranges from 300% to 700%. Preferably, the elongation at break of the modified polyurethane carrier substrate ranges from 350% to 680%.

According to the results in Table 2, compared to the conventional polyurethane carrier substrate, the modified polyurethane carrier substrate of the present disclosure has better thermal resistance (such as thermal expansion coefficient and thermal creep recovery).

According to Examples 1 to 3, when the amount of the chain extender (pyromellitic anhydride) is increased, the thermal resistance of the modified polyurethane carrier substrate is increased accordingly. However, when the amount of the chain extender is excessive (i.e., in Example 4, the amount of the chain extender is higher than 75 wt %), the modified polyurethane is brittle and unable to form a membrane.

In the present disclosure, the thermal expansion coefficient of the modified polyurethane carrier substrate ranges from 1.5 μm/° C. to 4.0 μm/° C. Preferably, the thermal expansion coefficient of the modified polyurethane carrier substrate ranges from 1.8 μm/° C. to 3.9 μm/° C. The thermal creep recovery of the modified polyurethane carrier substrate at 150° C. ranges from 50% to 80%. Preferably, the thermal creep recovery of the modified polyurethane carrier substrate at 150° C. ranges from 60% to 75%. The glass transition temperature of the modified polyurethane carrier substrate ranges from −35° C. to −60° C. The storage modulus of the modified polyurethane carrier substrate at −30° C. ranges from $2.0 \times 10^7$ to $5.0 \times 10^9$. Preferably, the storage modulus of the modified polyurethane carrier substrate at −30° C. ranges from $3.0 \times 10^7$ to $2.0 \times 10^9$. The storage modulus of the modified polyurethane carrier substrate at 150° C. ranges from $5.5 \times 10^6$ to $3.0 \times 10^8$. Preferably, the storage modulus of the modified polyurethane carrier substrate at 150° C. ranges from $5.7 \times 10^6$ to $2.0 \times 10^8$. The common logarithm of the ratio of the storage modulus of the modified polyurethane carrier substrate at −30° C. to the storage modulus of the modified polyurethane carrier substrate at 150° C. ranges from 0.40 to 1.30. Preferably, the common logarithm of the ratio of the storage modulus of the modified polyurethane carrier substrate at −30° C. to the storage modulus of the modified polyurethane carrier substrate at 150° C. ranges from 0.70 to 1.20.

Compared to the conventional polyurethane carrier substrate, the modified polyurethane carrier substrate of the present disclosure has a lower moisture absorption rate, thereby being suitable for manufacturing the flexible printed circuits. Specifically, the moisture absorption rate of the modified polyurethane carrier substrate is lower than 1.12%, and preferably, the moisture absorption rate of the modified polyurethane carrier substrate is lower than 0.8%.

Beneficial Effects of the Embodiments

In conclusion, in the modified polyurethane carrier substrate provided by the present disclosure, by virtue of "the chain extender being a dianhydride," and "a common logarithm of a ratio of a storage modulus of the modified polyurethane carrier substrate at −30° C. to a storage modulus of the modified polyurethane carrier substrate at 150° C. ranging from 0.40 to 1.30," the modified polyurethane carrier substrate can have good thermal resistance.

Further, by choosing specific chain extenders and controlling the amount of the chain extenders, the thermal resistance of the modified polyurethane carrier substrate of the present disclosure can be enhanced. In addition, by adjusting the structure of the hard segment (e.g., the hard segment containing crankshaft structure), the elastic strength of the modified polyurethane carrier substrate of the present disclosure can be enhanced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A modified polyurethane carrier substrate formed from a modified polyurethane, and the modified polyurethane including:
    a soft segment being formed from polyol; and
    a hard segment being formed from diisocyanate and chain extender,
        wherein the hard segment includes a crankshaft structure that changes a direction of a molecular chain of the modified polyurethane and a linear structure,
        wherein the crankshaft structure and the linear structure are formed from diisocyanate isomers,
        wherein the crankshaft structure is formed from 2,4'-diphenylmethanediisocyanate, and the linear structure is formed from 4,4'-diphenylmethanediisocyanate,
        wherein, based on a total weight of the modified polyurethane being 100 wt %, an amount of the crankshaft structure ranges from 10 wt % to 25 wt %,
    wherein the chain extender is a dianhydride;
    wherein a common logarithm of a ratio of a storage modulus of the modified polyurethane carrier substrate at −30° C. to a storage modulus of the modified polyurethane carrier substrate at 150° C. ranges from 0.40 to 1.30.

2. The modified polyurethane carrier substrate according to claim 1, wherein the chain extender is selected from the group consisting of: pyromellitic dianhydride (PMDA), 1,2,4,5-cyclohexanetetracarboxylic dianhydride (HPMDA), 4,4'-biphthalic anhydride (BPDA), 3,3',4,4'-benzophenonetetracarboxylic dianhydride (BTDA), 4,4'-(hexafluoroisopropylidene)diphthalic anhydride (6FDA), 4,4'-oxydiphthalic anhydride (ODPA), 3,4,9,10-perylenetetracarboxylic dianhydride (PTCDA), and 4,4'-(4,4'-isopropylidenediphenoxy)bis(phthalic anhydride) (BPADA).

3. The modified polyurethane carrier substrate according to claim 1, wherein, based on a total weight of the modified polyurethane being 100 wt %, an amount of the chain extender ranges from 10 wt % to 35 wt %.

4. The modified polyurethane carrier substrate according to claim 1, wherein, based on a total weight of the modified polyurethane being 100 wt %, an amount of the hard segment ranges from 30 wt % to 50 wt %.

5. The modified polyurethane carrier substrate according to claim 1, wherein a mass ratio of the diisocyanate that forms the crankshaft structure to the diisocyanate that forms the linear structure ranges from 1:0.8 to 1:1.2.

6. The modified polyurethane carrier substrate according to claim 1, wherein the polyol is selected from the group consisting of polyester polyol, polycarbonate polyol, or polyether polyol.

7. The modified polyurethane carrier substrate according to claim 1, wherein a number average molecular weight of the polyol ranges from 400 g/mol to 4000 g/mol.

8. The modified polyurethane carrier substrate according to claim 1, wherein the modified polyurethane is presented as formula (I):

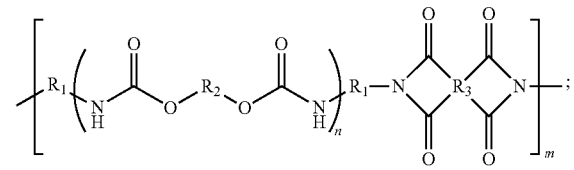

wherein $R_1$ is formed from the diisocyanate selected from the group consisting of: 2,4'-methylenebis(phenyl isocyanate) and 4,4'-methylenebis(phenyl isocyanate); $R_2$ is formed from the polyol; $R_3$ is selected from the group consisting of: a cyclohexane with a tetravalent bond, a benzene with a tetravalent bond, a biphenyl with a tetravalent bond, a benzophenone with a tetravalent bond, a diphenyl propane with a tetravalent bond, a diphenyl ether with a tetravalent bond, a perylene with a tetravalent bond, and a structure with a tetravalent bond presented by

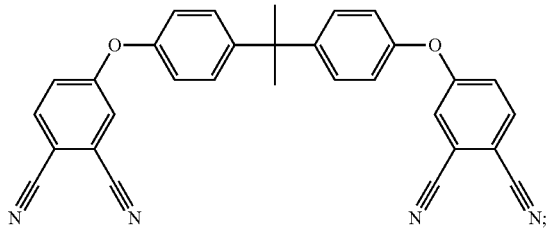 [SMILES: CC(C)(c1ccc(Oc2ccc(C#N)c(C#N)c2)cc1)c1ccc(Oc2ccc(C#N)c(C#N)c2)cc1]

and "n" and "m" each are independently integer ranges from 1 to 100.

9. The modified polyurethane carrier substrate according to claim 1, wherein the modified polyurethane is presented as formula (II):

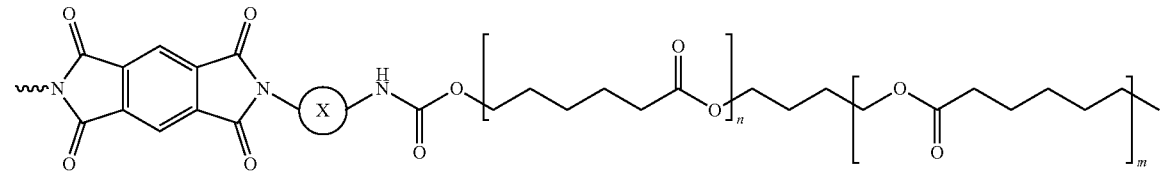

-continued
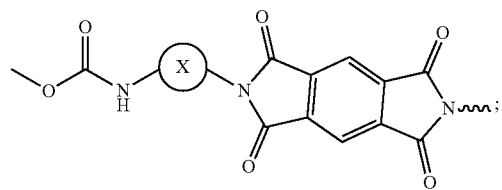
wherein "n" and "m" each are independently an integer ranging from 1 to 100, and
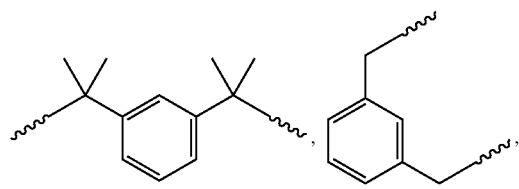
is selected from the group consisting of:
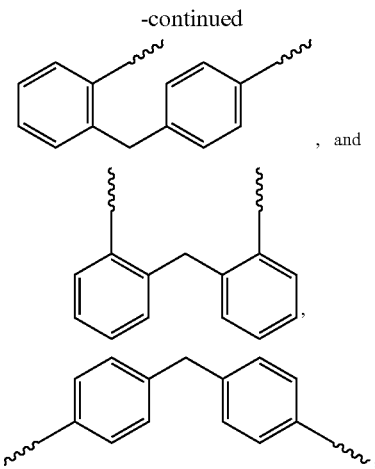
* * * * *